United States Patent [19]

Matsuura et al.

[11] Patent Number: 4,495,561
[45] Date of Patent: Jan. 22, 1985

[54] NUMERICAL CONTROL METHOD

[75] Inventors: Hitoshi Matsuura; Hachioji-shi, Hiroshi Sakurai, Hino-shi, both of Japan

[73] Assignee: Fujitsu Fanuc Limited, Tokyo, Japan

[21] Appl. No.: 395,904

[22] Filed: Jul. 7, 1982

[30] Foreign Application Priority Data

Jul. 7, 1981 [JP] Japan ................................ 56-105858

[51] Int. Cl.³ ............................................. G06F 15/46
[52] U.S. Cl. .................................... 364/167; 318/567; 364/169; 364/474
[58] Field of Search ................................ 364/167–171, 364/474, 475; 318/567, 569, 570, 573, 574

[56] References Cited

U.S. PATENT DOCUMENTS

| 3,416,056 | 12/1968 | Motooka et al. | 364/169 X |
| 3,878,983 | 4/1975 | Hamill et al. | 364/169 X |
| 4,034,192 | 7/1977 | Kishi et al. | 318/567 X |

FOREIGN PATENT DOCUMENTS 2294476  7/1976  France ................................ 364/169

Primary Examiner—Joseph F. Ruggiero
Attorney, Agent, or Firm—Staas & Halsey

[57] ABSTRACT

Disclosed is a numerical control method for a numerical control (NC) system having a device to execute a mirror image function wherein the moving direction of a movable member is reversed with respect to a commanded direction for each control axis, and a memory device to store coordinate values of a commanded position and coordinate values of a current machine position. This numerical control method comprises a step of storing the respective axial coordinate values of the current machine position at the time that the mirror image function has become effective, a step of calculating the commanded position coordinate values (CP) of directly preceding NC data after the mirror image function has become effective, by using the current machine position coordinate values and the position coordinate values at the time that the mirror image function has become effective, a step of calculating an incremental value ($CP_n-CP$) of the control axis, $CP_n$ denoting the command position coordinate value of the control axis for which the mirror image function commanded is additionally effective, a step of executing a pulse distribution calculation on the basis of the incremental value, a step of determining the moving direction of the movable member in dependence on the commanded direction and the effectiveness of the mirror image function, and a step of moving the movable member in the moving direction with distributed pulse obtained by the pulse distribution calculation.

3 Claims, 3 Drawing Figures

NUMERICAL CONTROL METHOD

BACKGROUND OF THE INVENTION

The present invention relates to a numerical control method. More particularly, it relates to a numerical control method for a numerical control system having a mirror image function.

A numerical control (NC) system has a mirror image function wherein the moving direction of a movable member, such as a tool or a table, is made the reverse of a commanded direction entered from an NC tape or the like. In general, the NC system has a memory for storing the coordinate values of a commanded position and the coordinate values of a current machine position. Irrespective of whether the mirror image function is in effect or not, the commanded position coordinate values stored in the memory are updated in the direction of an input command each time distributed pulses are generated. On the other hand, the current machine position coordinate values stored in the memory do depend upon whether or not the mirror image function is in effect. They are updated in the direction opposite to that of the input command for the effective mirror image function and in the same direction as that of the input command for the ineffective mirror image function each time the distributed pulses are generated. Thus, they indicate the current machine position at all times.

In a prior-art NC system, both the commanded position coordinate values and the current machine position coordinate values are updated each time a numerical command is given on the basis of which pulse distribution calculations are executed to generate distributed pulses. Simultaneously updating the two series of coordinate values during the pulse distribution in this manner leads to an increase in processing load and thus poses a major problem especially for an NC system which relies on a built-in microcomputer having low operating speed. It is sometimes impossible to update the coordinate values in the interval from one step of generating distributed pulses to the next step of generating distributed pulses. Particularly when the commanded speed is high, the time interval between the pulse generating steps is short. Moreover, processing steps other than those for coordinate value renewal must be performed in at the same time. Therefore, a situation arises wherein the coordinate value update does not take place in time and this is a significant source of trouble.

SUMMARY OF THE INVENTION

It is accordingly an object of the present invention to provide a numerical control method which requires the updating of only current machine position coordinate values and which can calculate and update commanded position coordinate values as the occasion may demand.

Another object of the present invention is to provide a numerical control method which can precisely update current machine position coordinate values and command position coordinate values even when the commanded speed is high. Disclosed is a numerical control (NC) method for a numerical control system having a device to execute a mirror image function wherein the moving direction of a movable member is reversed with respect to a commanded direction for each control axis, and a memory device to store coordinate values of a commanded position and coordinate values of a current machine position. This numerical control method comprises a step of storing the respective axial coordinate values of the current machine position at the time that the mirror image function has become effective, a step of calculating the commanded position coordinate values (CP) of directly preceding NC data after the mirror image function has become effective, by using the current machine position coordinate values and the position coordinate values at the time that the mirror image function has become effective, a step of calculating an incremental value ($CP_n-CP$) of the control axis, $CP_n$ denoting the command position coordinate value of the control axis for which the mirror image function commanded is additionally effective, a step of executing a pulse distribution calculation on the basis of the incremental value, a step of determining the moving direction of the movable member in dependence on the commanded direction and the effectiveness of the mirror image function, and a step of moving the movable member in the moving direction with distributed pulses obtained by the pulse distribution calculation.

Other features and advantages of the invention will be apparent from the following description taken in connection with the accompanying drawings.

DESCRIPTION OF THE PREFERRED EMBODIMENT

Figure 1:
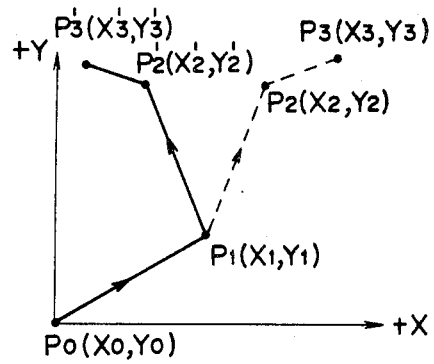
FIG. 1 is a diagram for explaining the mirror image function.
Figure 2:
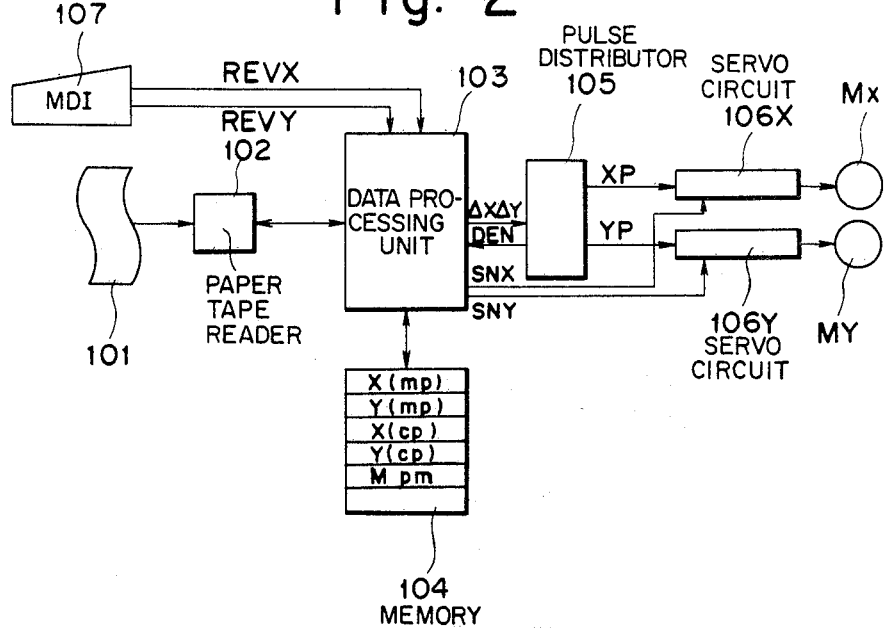
FIG. 2 is a block diagram showing of an embodiment of the present invention.

FIG. 1 is a diagram for explaining the mirror image function, while FIG. 2 is a block diagram for realizing the present invention. Reference will first be had to FIG. 1 to describe the mirror image function.

The mirror image function is a function in which the moving direction of a movable member, such as tool or table, in an automatic operation mode is reversed with respect to the direction of an input command entered from an NC tape or the like so as to effect symmetric cutting, etc. Such mirror image functions can be set for respective axes independently of one another. The setting of the mirror image function can be made with the keyboard of an MDI (manual data input) device or the like. Accordingly, when the mirror image function is set to be effective for only the X-axis at a point $P_1$ in FIG. 1 by means of the MDI device or the like, the movable member such as a tool is moved along a solid line $P_1P_2'$ regardless of the fact that the commanded curve is $P_1P_2$ (dotted line). At the moment that the tool is positioned at the point $P_2'$, the coordinate values of a commanded position become ($X_2$, $Y_2$) and those of the current machine position become ($X_2'$, $Y_2'$). Here, letting ($X_1$, $Y_1$) denote the coordinates of the point $P_1$ where the mirror image function has been effectuated, the following relations are satisfied:

$$X_1 = (X_2 + X_2')/2, \quad Y_1 = (Y_2 + Y_2')/2$$

As is apparent from the above, after the mirror image function has been effectuated, the coordinate values of commanded positions differ from those of current machine positions.

Referring now to FIG. 2, numeral 101 designates a paper tape in which a command program is punched, and numeral 102 a paper tape reader. A data processing unit 103 loads data and executes NC control processing as well as other control operations and process steps. A memory 104 stores current machine position coordinate values X(mp) and Y(mp), commanded position coordinate values X(cp) and Y(cp), the coordinate value Mpm of a position where the mirror image function has been effectuated, and so forth. A block 105 is a known pulse distributor which executes pulse distribution calculations on the basis of the incremental values ΔX and ΔY of the respective axes delivered from the data processing unit 103 and which delivers distributed pulses $X_p$ and $Y_p$. Symbols 106X and 106Y denote known servo circuits for the X- and Y-axes, and symbols MX and MY servomotors, respectively. An MDI device 107 is used for the setting of the mirror image function, the entry of one block of data, the indication of a current machine position, etc.

The tool is positioned at the point $P_1$ (refer to FIG. 1) by any method, such as by a manual operation or tape control. After the positioning, the mirror image function is effectuated for only the X-axis by operating the MDI device 107. Thus, an X-axis moving direction reversal signal REVX which is provided by the MDI device 107 assumes a high level ("1"), whereas a Y-axis moving direction reversal signal REVY still remains at a low level ("0"). The high level of the X-axis moving direction reversal signal REVX allows the data processing unit 103 to store, in a predetermined area of the memory 104 (Mpm=$X_1$), the current machine position coordinate value at the time that the mirror image function is effectuated, in other words, the X-axis coordinate value of the point $P_1$.

When a cycle start button (not shown) is subsequently depressed, data for the path $P_1P_2$ is read from the paper tape 101 by the tape reader 102 and is entered into the data processing unit 103. Then, the processing unit calculates the incremental values ΔX (=$X_2-X_1$) and ΔY (=$Y_2-Y_1$) of the respective axes and enters them into the pulse distributor 105 and also delivers an X-axis moving direction signal SNX and a Y-axis moving direction signal SNY to the servo circuits 106X and 106Y of the respective axes. The moving direction signals SNX and SNY are determined by the X-axis moving direction reversal signal REVX and Y-axis moving direction reversal signal REVY, indicative of whether the mirror image function is in effect, and an X-axis commanded direction signal CX and Y-axis commanded direction signal CY provided by the paper tape 101. Table 1 below lists the relationships concerning the X-axis between the X-axis moving direction reversal signal REVX, the commanded direction CX and the moving direction SNX.

TABLE 1

| CX (commanded direction) | REVX (reversal) | SNX (moving direction) |
|---|---|---|
| + | "0" | + |
| − | "0" | − |
| + | "1" | − |
| − | "1" | + |

Table 2 below lists the relationships concerning the Y-axis between the Y-axis moving direction reversal signal REVY, the commanded direction CY and the moving direction SNY.

TABLE 2

| CY (commanded direction) | REVY (reversal) | SNY (moving direction) |
|---|---|---|
| + | "0" | + |
| − | "0" | − |
| + | "1" | − |
| − | "1" | + |

When supplied with the incremental values ΔX (=$X_2-X_1$) and ΔY (=$Y_2-Y_1$), the pulse distributor 105 immediately starts the pulse distribution calculations and supplies the distributed pulses $X_p$ and $Y_p$ to the servo circuits 106X and 106Y of the respective axes. In response to the distributed pulses $X_p$ and $Y_p$, the servo circuits 106X and 106Y perform known servo control to rotate the servomotors MX and MY in directions indicated by the moving direction signals SNX and SNY, respectively. As a result, the tool is moved along the path $P_1P_2'$ (solid line in FIG. 1) symmetric to the command path $P_1P_2$.

On the other hand, each time the distributed pulses $X_p$ and $Y_p$ are generated, or each time position detection pulses are generated by a detector such as pulse coder (not shown) the data processing unit 103 determines the coordinate axial values X(mp) and Y(mp) of the current machine position in accordance with the respective moving direction signals SNX and SNY by the following equations so as to update the current machine position coordinate values:

$$X(mp) \pm 1 \rightarrow X(mp) \quad (1)$$

$$Y(mp) \pm 1 \rightarrow Y(mp) \quad (2)$$

In the above equations, the sign + indicates movement in the positive direction, and the sign − indicates movement in the negative direction. That is, each time the distributed pulses $X_p$ and $Y_p$ are generated, the data processing unit 103 reads out the coordinate axial values X(mp) and Y(mp) of the current machine position from the storage area of the memory 104 for the current machine position, performs the calculations of Equations (1) and (2) and stores the calculated results in the current machine position-storing area of the memory 104 again.

When the distributed pulses $X_p$ and $Y_p$ in numbers corresponding to the respective incremental values ΔX (=$X_2-X_1$) and ΔY (=$Y_2-Y_1$) have been generated by the pulse distributor 105, the pulse distribution calculations end, and a distribution end signal DEN is generated by the pulse distributor 105. The current machine position coordinate values X(mp) and Y(mp) become equal to $X_2'$ and $Y_2'$ (in FIG. 1), respectively. In response to the distribution end signal DEN, the data processing unit 103 allows the tape reader 102 to read NC data on the next path $P_2P_3$.

Subsequently, the data processing unit 103 calculates the following equations by using the coordinate values ($X_1$, $Y_1$) of the position $P_1$ where the mirror image function has been effectuated and the X-axial and Y-axial coordinate values ($X_2'$, $Y_2'$) of the current machine position $P_2'$, so as to obtain the coordinate values ($X_2$, $Y_2$) of the commanded position $P_2$ of the preceding block:

$$X_2 = X_1 + (X_1 - X_2') \quad (3)$$

$$Y_2 = Y_2' \quad (4)$$

Thereafter, the data processing unit 103 evaluates the incremental values ΔX and ΔY of the respective axes by the following equations, so as to perform position control similar to the foregoing on the basis of these incremental values ΔX and ΔY:

$$\Delta X = X_3 = X_2, \quad \Delta Y = Y_3 - Y_2 \tag{5}$$

As described above, in the present invention, only the coordinate values of the current machine position are normally updated, and each time the coordinate values of the command position are needed, they are found using the coordinate values of the position at which the mirror image function has been effectuated and the coordinate values of the current machine position. In general, the following relationship holds between the position MPm where the mirror image function has been effectuated, the current machine position MP, and the commanded position CP:

$$CP = MPm + (MPm - MP) \tag{6}$$

Accordingly, the coordinate values of the commanded position are obtained in such a manner that when the mirror image functions have been effectuated for both the X- and Y-axes, the calculation of Equation (6) is executed for both the axes, and that when the mirror image function has been effectuated for only one axis, the calculation of Equation (6) is executed for only that axis.

In the above description, a case has been described where, in evaluating the incremental values, the commanded position coordinate values are obtained with Equation (6). However, the present invention is not retricted thereto; the commanded position coordinate values can be obtained by calculating Equation (6) in a case where the NC system has been reset.

Figure 3:
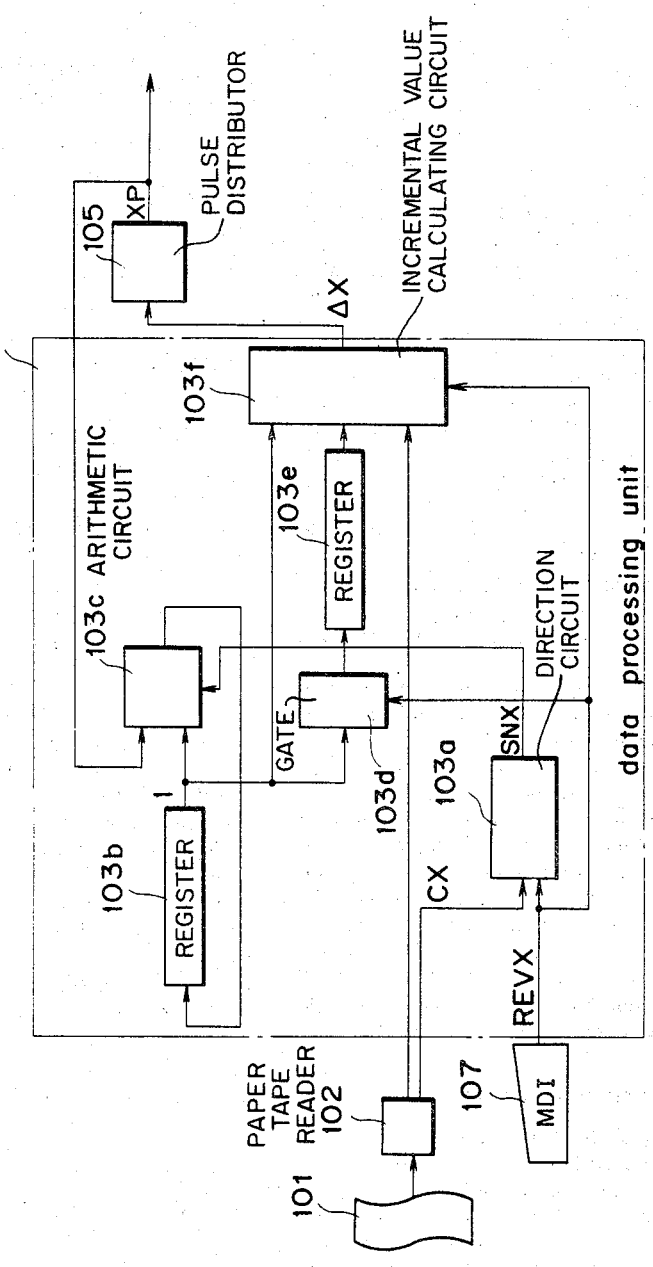
FIG. 3 is a block diagram of a data processing unit.

FIG. 3 is a block diagram of the data processing unit 103, and shows only parts concerning the X-axis.

A moving direction-determining circuit 103a forms and delivers the actual X-axis moving direction signal SNX of the machine in conformity with the relationship indicated in Table 1 and on the basis of the values "1" or "0" of the commanded direction signal CX read from the paper tape 101 and the X-axis moving direction reversal signal REVX delivered by the MDI device 107. A current machine position register 103b keeps the X-axial coordinate value of the current machine position stored therein, and its content is updated by one in the positive or negative direction in accordance with the X-axis moving direction of the machine each time the distributed pulse $X_p$ is generated by the pulse distributor 105. More specifically, each time the distributed pulse $X_p$ is generated, an arithmetic circuit 103c calculates Equation (1) and supplies the calculated result to the current machine position register 103b to update the content thereof by one. A gate circuit 103d is enabled for a predetermined time when the X-axis moving direction reversal signal REVX has been changed from "0" to "1", that is, when the mirror image function has been effectuated. Thus, the X coordinate value of the current machine position stored in the current machine position register 103b at that time is transmitted to and stored in a register 103e. That is, the register 103e stores the current machine position at the time that the mirror image function has been effectuated. In response to the X-axis moving direction reversal signal REVX of "1", an incremental value calculating circuit 103f performs the calculations of Equations (3) and (5) with the positional command read from the paper tape 101, to obtain the incremental value ΔX in the X-axis direction and to deliver it to the pulse distributor 105.

As set forth above, according to the present invention, the commanded position need not be updated normally each time the distributed pulse is generated, but only the current machine position may be updated, and the commanded position of a preceding block can be found as the occasion may demand. As a result, the period of time for calculations can be shortened, and processing can be completed with sufficient margin remaining.

What we claim is:

1. In a numerical control method for a numerical control system having means for executing a mirror image function wherein the moving direction of a movable member is reversed with respect to a commanded direction for each control axis, and memory means for storing coordinate values of a commanded position and coordinate values of a current machine position, the numerical control method for the numerical control system comprising the steps of:

(a) updating the current machine position coordinate value of the effective ocntrol axis for which the mirror image function is effective, in the direction which is the reverse of the commanded direction in accordance with the position of said movable member and updating the current machine position coordinate value of the ineffective control axis for which the mirror image function is ineffective, in the same direction as the commanded direction in accordance with the position of said movable member;

(b) storing respective axial coordinate values of the current machine position at the time that the mirror image function has become effective; and (c) calculating the commanded position coordinate values of directly preceding numerical control data after the mirror image function has become effective, by using the current machine position coordinate values and the axial coordinate values at the time that the mirror image function has become effective.

2. A numerical control method for a numerical control system as defined in claim 1, wherein MP equals the current machine position coordinate value of the effective control axis for which the mirror image function is effective, MPm equals the axial coordinate value of the effective control axis at the time that the mirror image function has become effective, and CP equals the commanded position coordinate value of the effective control axis, and the commanded position coordinate value CP in step (c) is calculated by:

$$CP = MPm + (MPm - MP)$$

3. A numerical control method for a numerical control system as defined in claim 1 or claim 2, further comprising the steps of:

(d) calculating an incremental value $(CP_n - CP)$ of the effective control axis, where $CP_n$, equals the commanded position coordinate value of the effective control axis for which the mirror image function commanded is additionally effective and CP equals the commanded position coordinate value;

(e) executing a pulse distribution calculation on the basis of said incremental value to produce distributed pulses;
(f) determining the moving direction of the movable member in dependence on the commanded direction and the effectiveness of the mirror image function; and
(g) moving said movable member in said moving direction independence upon the distributed pulses produced by said pulse distribution calculation.

* * * * *

UNITED STATES PATENT AND TRADEMARK OFFICE
CERTIFICATE OF CORRECTION

PATENT NO. : 4,495,561
DATED : January 22, 1985
INVENTOR(S) : Hitoshi Matsuura et al.

It is certified that error appears in the above-identified patent and that said Letters Patent is hereby corrected as shown below:

Column 6, line 26, "ocntrol" should be --control--.

Signed and Sealed this

Twenty-fifth Day of February 1986

[SEAL]

Attest:

DONALD J. QUIGG

*Attesting Officer*    Commissioner of Patents and Trademarks